INVENTORS
C.J.Heltzel
E.A.Gardner &
W.J.Kirchner

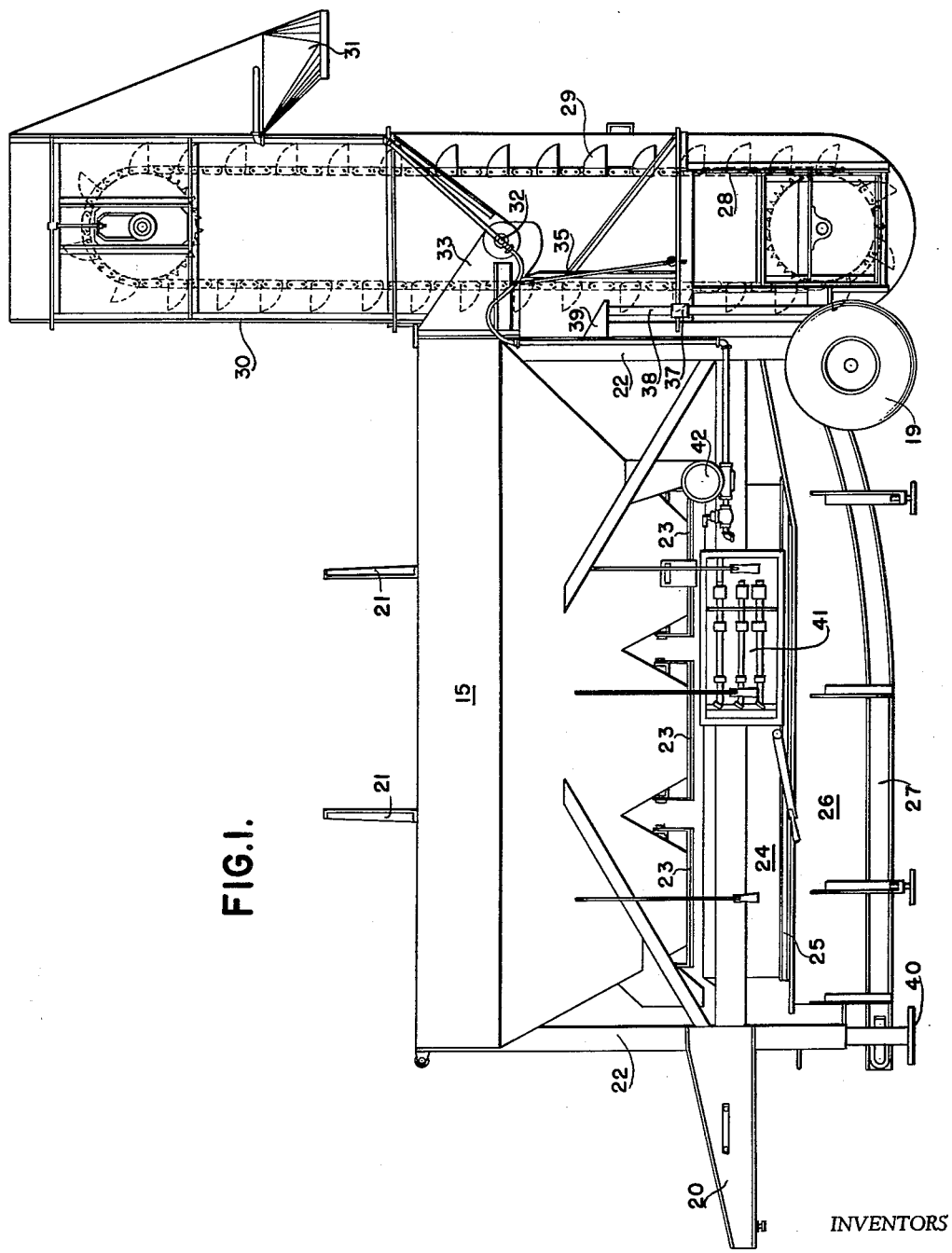

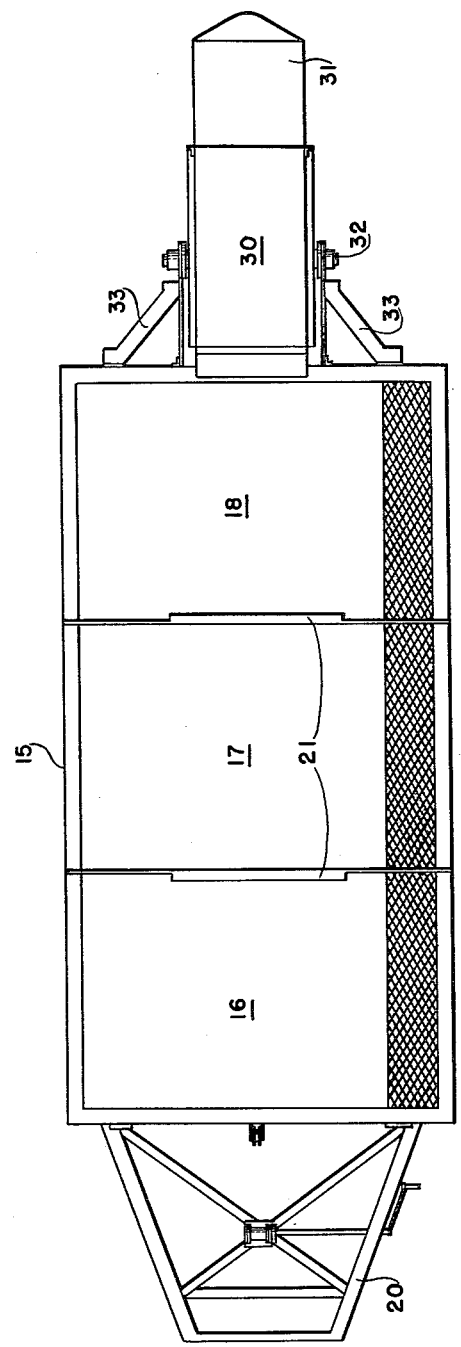

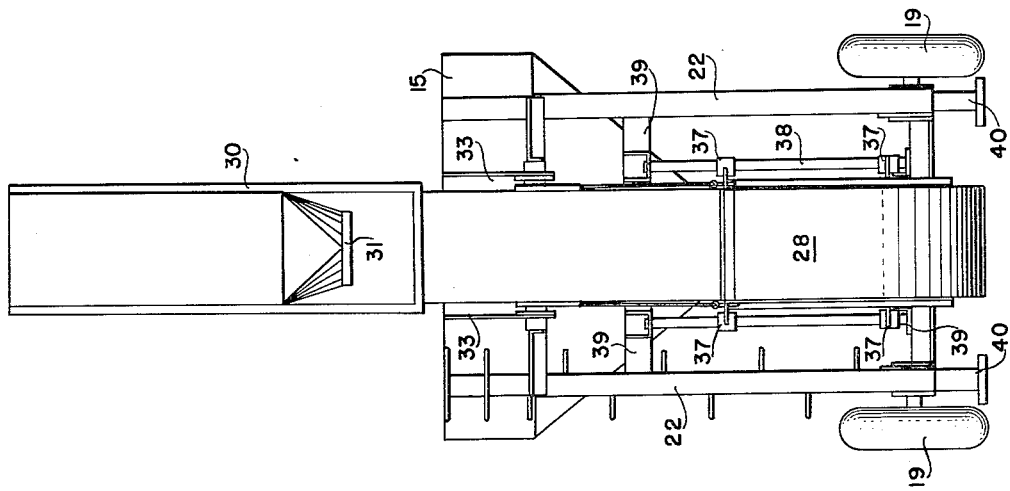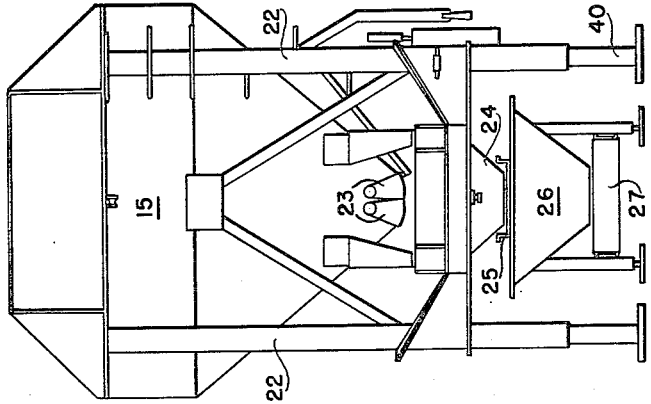

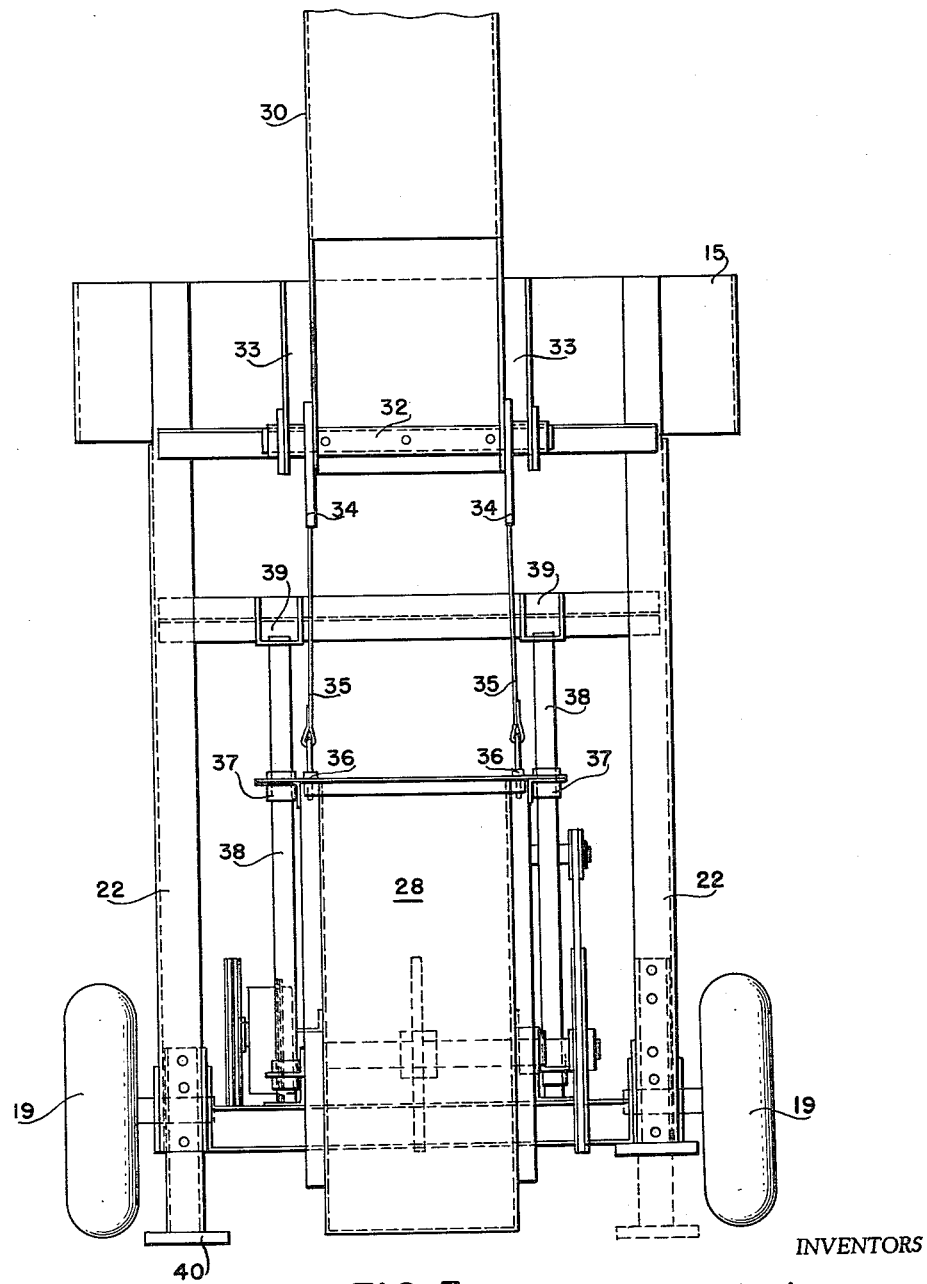

Aug. 14, 1962     C. J. HELTZEL ET AL     3,049,248
PORTABLE BATCHING PLANT
Filed Jan. 8, 1959                9 Sheets-Sheet 7

INVENTORS
C.J. Heltzel
E.A. Gardner &
W.J. Kirchner
BY Wilkinson, Mawhinney & Thibault
ATTORNEYS

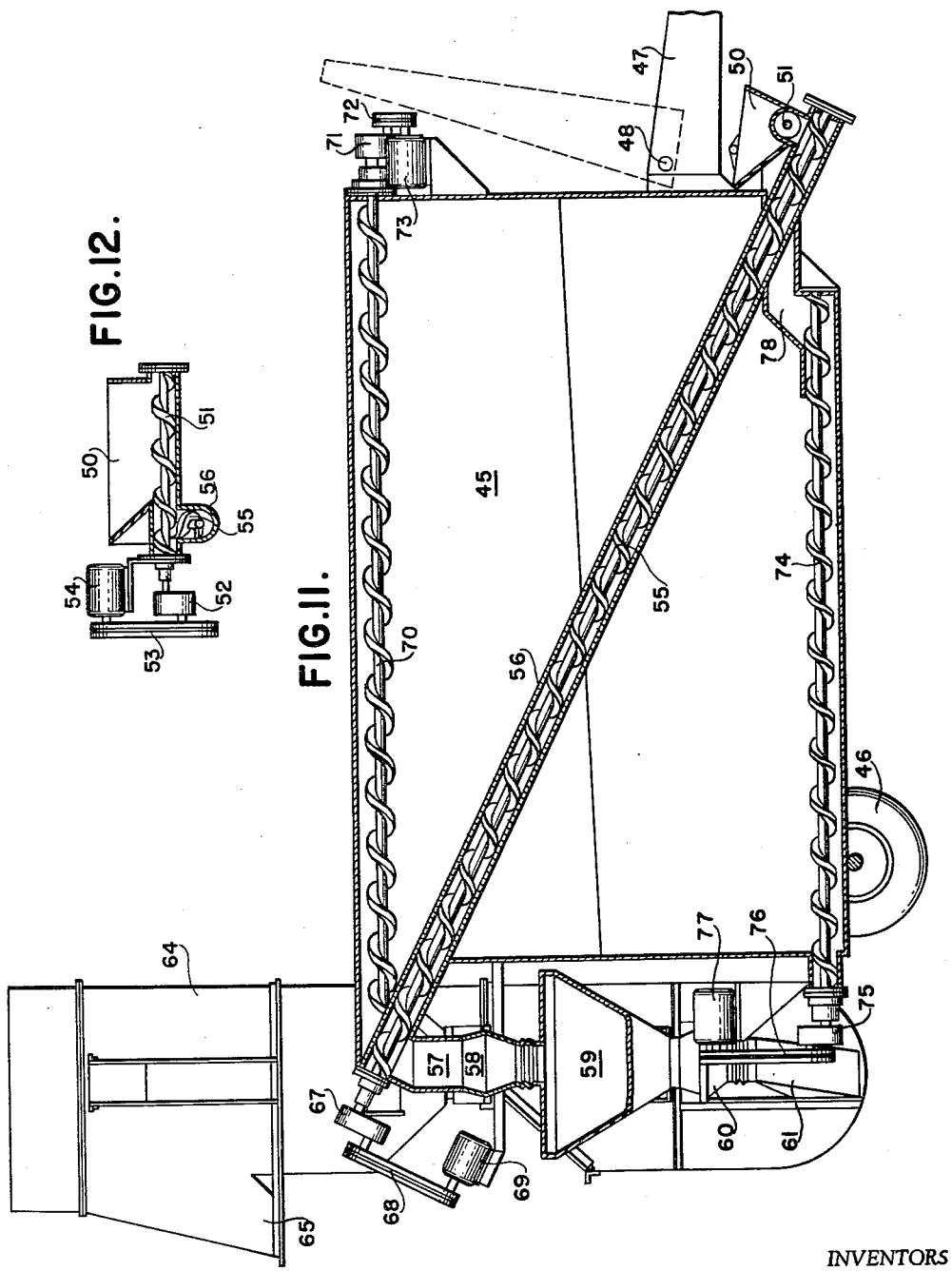

United States Patent Office 3,049,248
Patented Aug. 14, 1962

3,049,248
PORTABLE BATCHING PLANT
Carl J. Heltzel and Ernest A. Gardner, Warren, and William J. Kirchner, Youngstown, Ohio, assignors to The Heltzel Steel Form and Iron Co., Warren, Ohio, a corporation of Ohio
Filed Jan. 8, 1959, Ser. No. 785,662
2 Claims. (Cl. 214—17)

The present invention relates to portable batching plant and is more particularly concerned with a mobile plant which may be transported to the site of concrete structure operations for bringing to the job, sand, aggregate, water and cement and there batching and mixing the same for the immediate local requirements.

The invention proposes two units, a portable aggregate plant and a portable bulk cement operation plant, the apparatus being divisible structurally for convenience in building the same, in transportation over the road, and operation at the job, although it is conceivable that the same may be combined into a single unit.

An object of the invention is to provide batching equipment which is directly portable and at the same time efficient and versatile.

Another object of the invention is to provide an apparatus which permits of continuous batching methods whereby with relatively small batching equipment suitable for transportation a large volume of batched materials may be continuously delivered by the plant.

A further object of the invention is to provide a plant in which all operations of the units are controlled from the ground level.

A still further object of the invention is to provide elevators having foldable head sections which in the folded condition satisfy highway clearance requirements but which may be readily raised at the job for proper elevator operations.

A still further object of the invention is to provide in conjunction with the foldable head sections of the elevators a vertically slidable boot section which in the operative position may descend to a position lower than highway clearance requirements but which may be raised for transportation purposes to the height of such requirements.

A still further object of the invention is to provide coordinate foldable head and slidable boot sections of the elevator connected together in such wise that the vertically sliding boot section will act as a counter-balance for the movement of the head section to the end of reducing power requirements for the elevating and lowering of the two sections.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a side elevational view of one form of aggregate plant constructed in accordance with the present invention.

FIGURE 2 is a top plan view of the same.

FIGURE 3 is an end elevational view taken from the right end of FIGURE 1.

FIGURE 4 is a similar view taken from the left end of FIGURE 1.

FIGURE 5 is an end elevational view, taken on a much magnified scale, of the right-hand end of the plant with an upper portion of the elevator omitted.

FIGURE 11 is a longitudinal sectional view taken through the plant.

FIGURE 12 is a transverse sectional view taken through the receiving hopper and its feed conveyer and connections.

Figure 6:
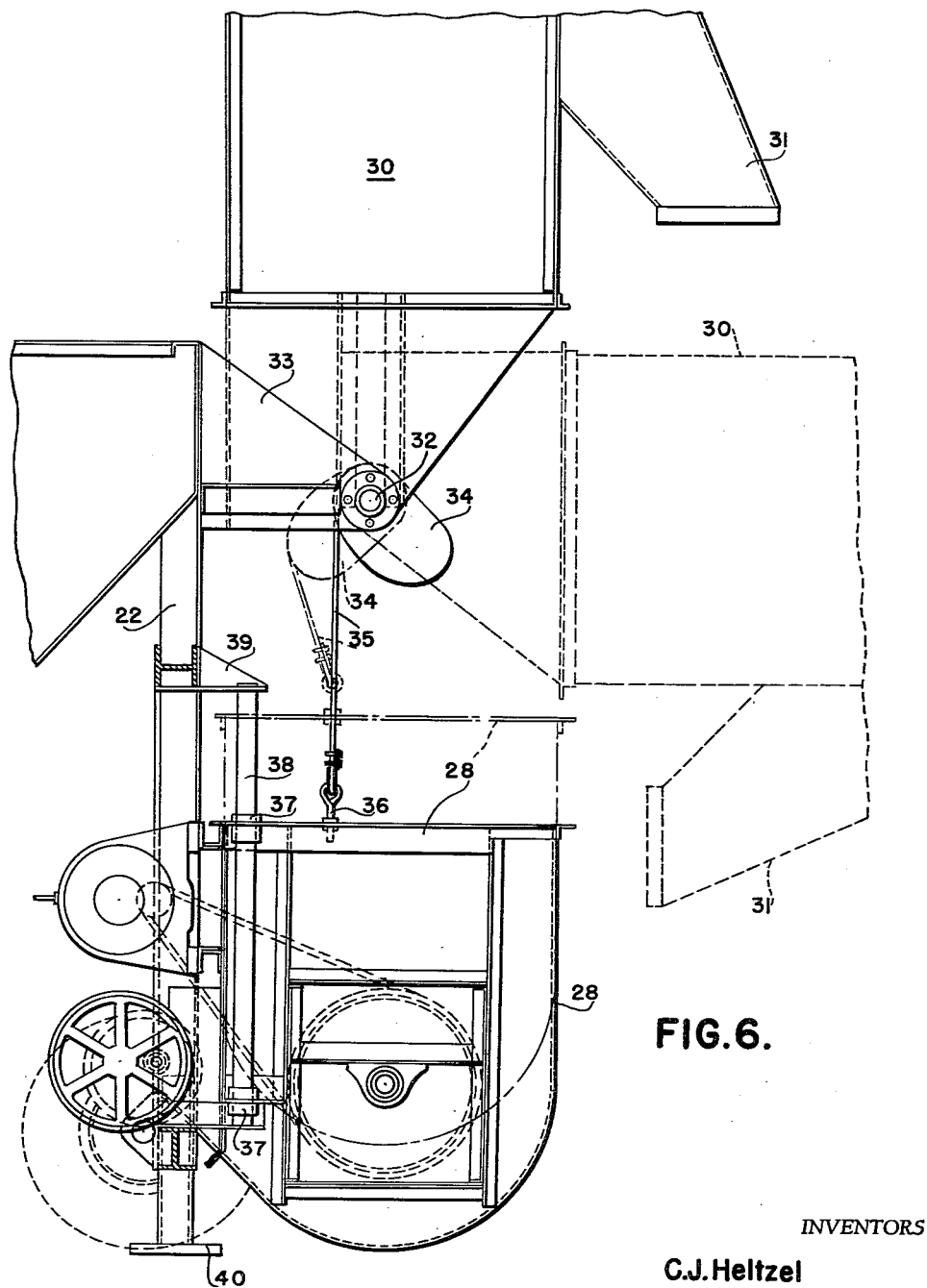
FIGURE 6 is a fragmentary side elevational view of the elevator section of the plant, also taken on a much magnified scale and showing in dotted lines the foldable position of the head section and the raised position of the boot section.
Figure 7:
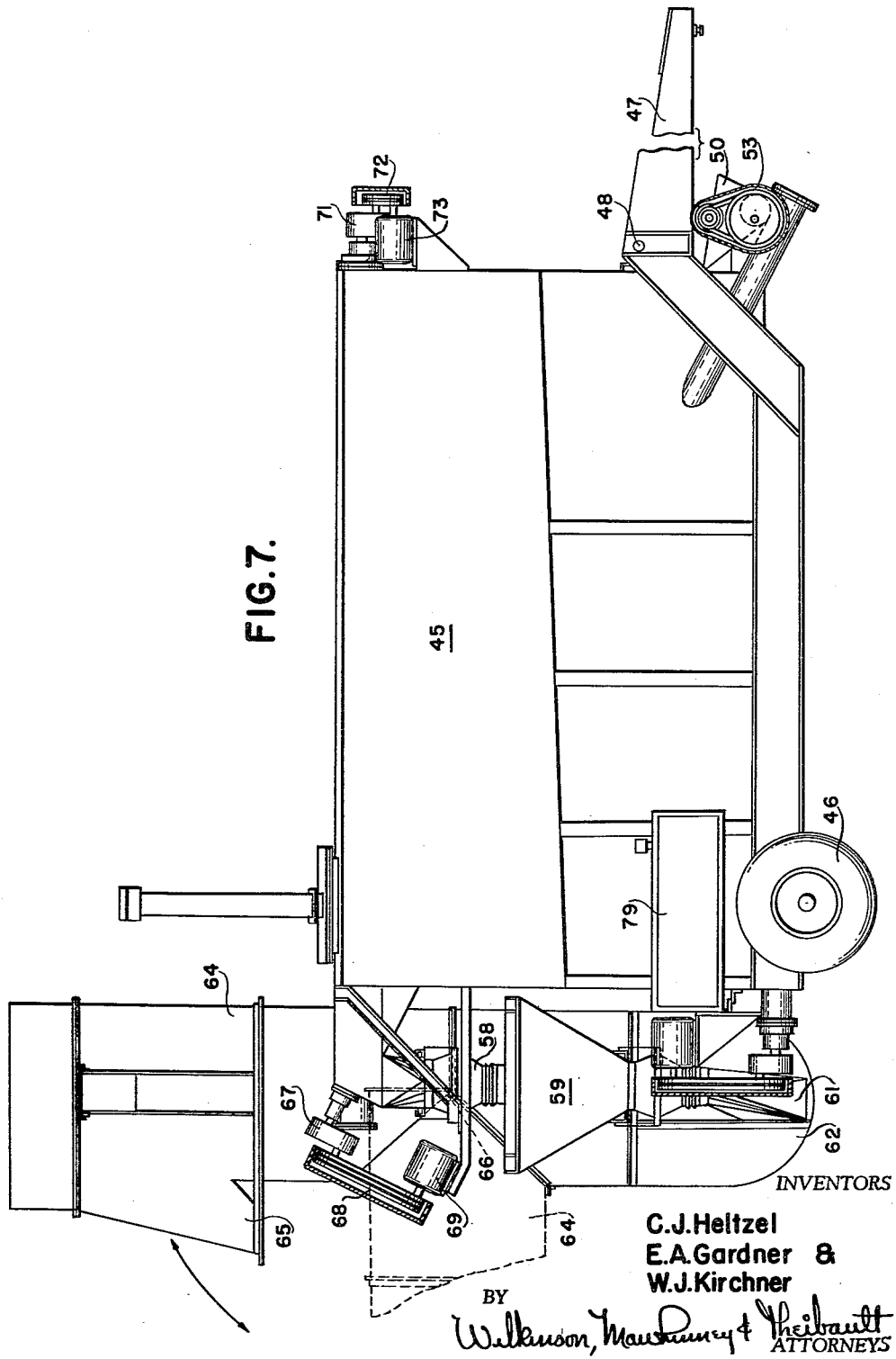
FIGURE 7 is a side elevational view of the bulk cement plant.
Figure 8:
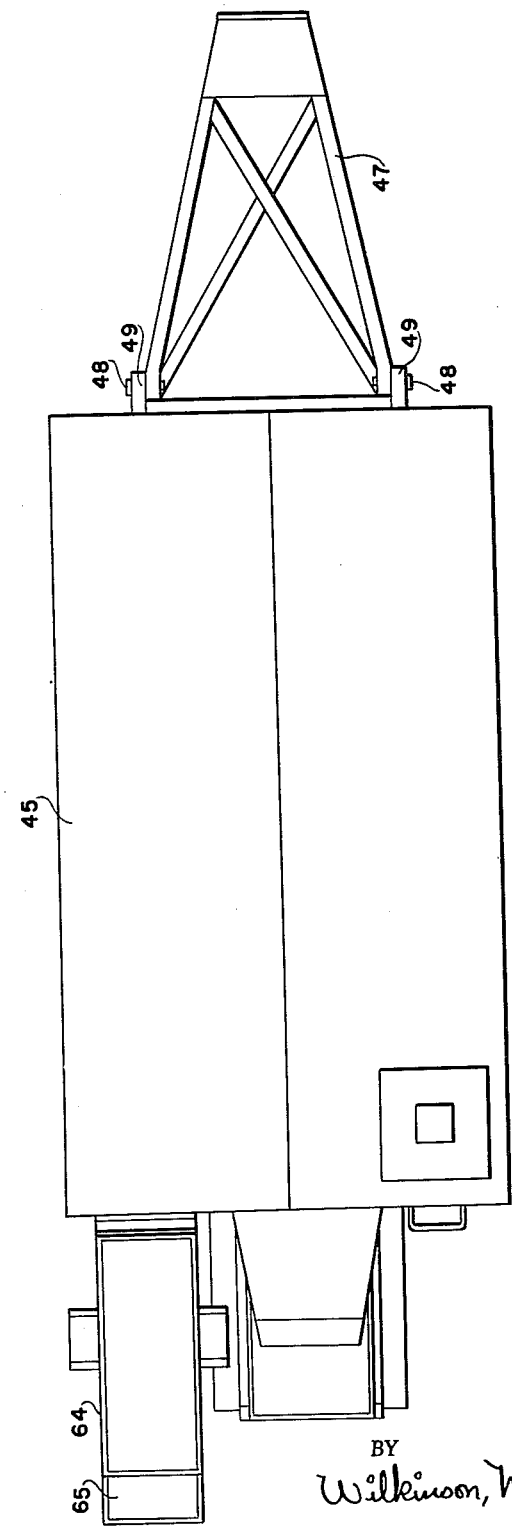
FIGURE 8 is a top plan view of the same.
Figure 9:
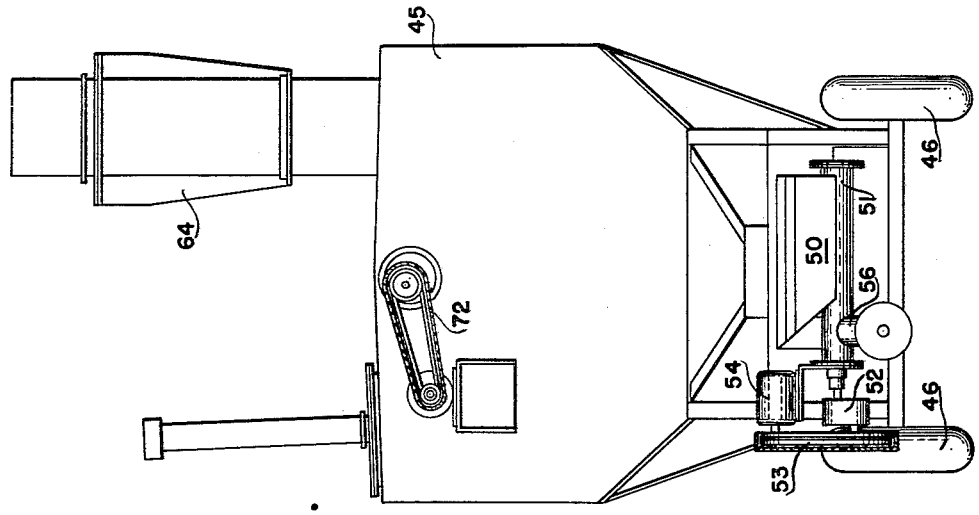
FIGURE 9 is an end elevational view taken from the right end of FIGURE 7.

Referring more particularly to FIGURES 1 to 6, inclusive, which illustrates the aggregate plant, 15 designates a bin having compartments 16, 17 and 18 for instance for sand and two aggregates, such bin being supported upon transportation wheels at one end and having a fifth wheel 20 at the other end.

The bin is provided with heaped capacity plates 21 hinged or otherwise foldable to the bin compartment walls.

The separate compartments of the bin are provided with clamshell or other form of discharge gates 23 below which is a weigh batch hopper 24 having a lower sliding type discharge gate 25 above a surge hopper 26 with which is associated a belt conveyor 27.

The belt conveyor 27 delivers to a boot section 28 of an aggregate elevator 29 having also a head section 30, provided with a discharge spout 31. The head section 30 is affixed to a shaft 32 journalled for rotation in outrigger brackets 33. Affixed to the shaft 32 are cams 34 to which the uper ends of cables 35 are affixed. The lower ends of these cables are affixed at the points 36 to the boot section 28. The boot section carries sleeves 37 slidable up and down upon guide rods 38 held in brackets 39 upon the supporting columns 22 or other parts of the framework of the machine. The elevator has a cover for the front of the casing. This cover is put in place after head section is removed.

At 40 are shown adjustable feet for supporting the plant at site. The feet 40 are adjustable by means of sliding pins to take care of irregularities in grade.

A beam scale 41 and a water meter 42 are shown as located on the side of the plant within reach from ground level.

In the use of this form of the device, the fifth wheel 20 is engageable by a track tractor which will raise the plant off the supporting feet 20 so that it is able to roll along the wheels 19. The bin 15 is well within highway clearances, normally having an overal height of eleven feet in the transportation position inasmuch as the heaped capacity plates 21 are folded into the flat position, therefore retaining this overall height of eleven feet. The overall width of the bin 15 is also within transportation clearance requirements and ordinarily this width will be eight feet.

The supporting columns 22 of the bin are inset with respect to the transportation wheels 19 whereby the wheels are accommodated within highway clearance requirements and are still accessible for the changing of wheels, tires, etc.

For transportation purposes over the highway, the head section 30 of the elevator is also folded or rotated down to the dotted line position shown in FIGURE 6 in which its upper plane is substantially in alignment with a horizontal top plane of the bin 15. In executing this movement the cams 34 are compelled to rotate with the head section 30 through the shaft 32 and are hence moved from the full to the dotted line position of FIGURE 6. Incident to this motion, the cables 35 are drawn up and the boot section 28 is elevated sliding by means of the sleeves 37 on the guide rods 38 from the full position of FIGURE 6 to the raised dotted position. In a satisfactory embodiment of the invention this lift of the boot section 28 is through a linear distance of eighteen inches, giving ample road clearance. On arrival at the site of the operations, the head section 30 is rotated up to the full line position permittng the cams 34 to return to the full line position in FIGURE 6 which slackens the cables 35 and permits the boot section 28 to descend by gravity to a low position, lower than road clearance requirements in order to be in a more favorable position for receiving material from the belt conveyor 27.

This arrangement not only permits the elevator boot section to be raised and lowered very efficiently in one operation by means of the cams 34 but the head section 30 is also counterbalanced by the boot 28 of the elevator in both its raising and lowering movements which substantially decreases the work required to raise the elevator into operative position and also in lowering the elevator for subsequent transportation requirements.

The discharge gates 23 on each compartment permit the flow of material from each individual compartment 16, 17 and 18 to be controlled, such material then being delivered to the weigh batch hopper 24. The weigh batch hopper is a long, shallow device having a continuous discharge gate 25 for the majority of its length.

The weighed batch is discharged from the batcher 24 through the discharge gate 25 into the surge hopper 26 onto the belt conveyor 27. The material is conveyed on the conveyor 27 into the boot 28 of the aggregate elevator 29. The batched material is then elevated and discharged out the discharge spout 31 into waiting trucks or whatever receptacle is desired.

In many situations, large batches are required of say six to eight yards, as that is the load requirement of a particular size of truck mixer. While a large batcher of this capacity is indicated, the large batcher presents the problem of portability which involves the factor of retaining close tolerances as required for transportation. At the same time there is the problem of producing the volume desired by the operator. Besides the transportation and available space problem with the use of a batcher of large capacity, the latter also encroaches upon the available space and the available capacity of a portable plant which might be used in the bin structure itself. Where a large batcher is used, it is impracticable to provide the surge hopper 26.

These problems are solved in the plant of this invention by standardizing on a relatively small batcher 24 of one yard capacity so that immediately upon completing the weighing cycle the operator is permitted to discharge the complete batch into the surge hopper 26, thus making it possible to immediately reweigh a subsequent batch delivered into the weigh hopper 24 while getting rid of the completed batch which is now in the surge hopper 26 by conveying the same on a belt conveyor 27 into the elevator 29.

It will be understood that on certain installations the elevator may be eliminated and the conveyer 27 may discharge directly into the skip of a mixer. Or the material may be delivered to a portable belt conveyor which may be arranged to elevate the material rather than by use of the elevator.

Referring more particularly to FIGURES 7 to 12 inclusive, the bulk cement plant consists generally of a main tank 45 mounted on transportation wheels 46 and having at its front portion a retractable fifth wheel 47 mounted in pivots 48 carried by the tank 45 or framework of the plant so that the fifth wheel may be swung into the upper elevated position indicated in dotted lines in FIGURE 11 to expose the mouth of the receiving hopper 50 for receiving charges of cement.

The fifth wheel 47 is pivoted in brackets 49 and locks in place when in transporting position.

At the bottom of the receiving hopper 50 is a transverse screw conveyor 51 driven through a reduction gear 52 and V-belt drive and sprocket transmission 53 from a motor 54. The transverse conveyor 51 delivers to the lower end of an inclined batching screw conveyor 55 mounted in an enclosed casing 56 which passes up diagonally through the main tank 45.

At its upper rear end the conveyor 55 delivers to an elevated hopper 57 at the rear end of the plant. From the hopper 57, the material is delivered through a wringer valve 58 to a weigh batcher 59 having a discharge gate 60 for controlling the delivery of the weighed material to a surge receptacle 61.

The surge receptacle 61 is in communication with the boot section 62 of a bulk cement elevator 63. This elevator includes a head section 64 adapted to extend up above the upper horizontal plane of the tank 45 and which is accordingly arranged to rotate about a pivot 66 to bring it down within this plane as indicated by dotted lines in FIGURE 7. The head section 64 is provided with a discharge spout.

The inclined conveyer 55 may be driven by a reduction gear 67 through chain and sprocket transmission 68 from a motor 69.

Figure 10:
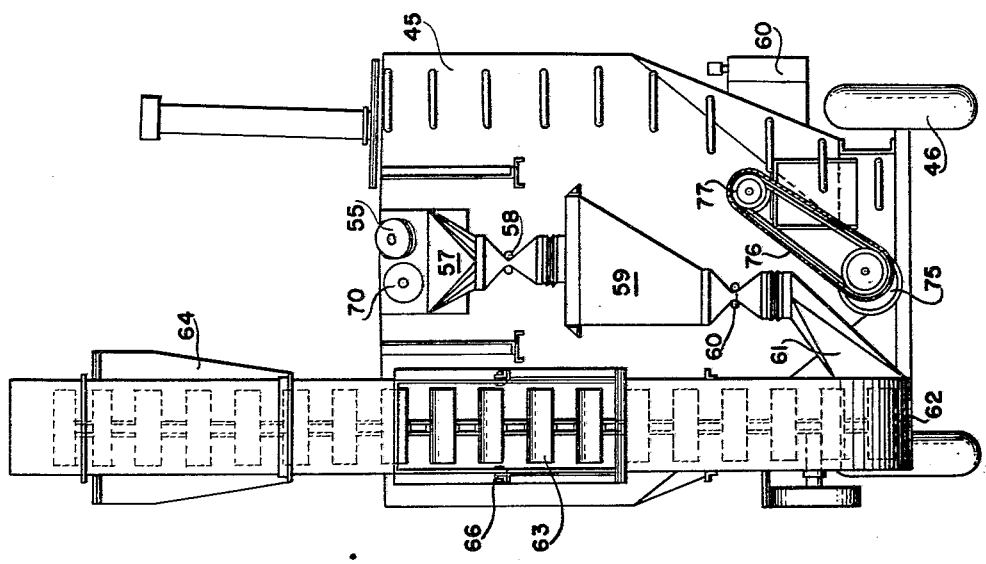
FIGURE 10 is also an end elevational view taken from the left-hand end of FIGURE 7.

An open screw conveyer 70 is disposed in the top of the tank 45 as shown in FIGURE 11, the receiving end of this conveyer 70 being disposed in the hopper 57 as shown in FIGURE 10. The screw conveyer 70 may be driven by reduction gear 71 through chain and sprocket transmission 72 from a motor 73.

A bottom screw conveyer 74 is mounted in the extreme bottom of the tank 45, the same being driven by reduction gear 75 through chain and sprocket transmission 76 from the motor 77. At its forward end, the bottom screw conveyer 74 communicates with a tube outlet 78 which delivers to the receiving hopper 50.

It will be understood that other forms of drives for the various conveyers may be employed other than the reduction gears and chain and sprocket transmissions illustrated and described.

In the use of this form of the invention, a tractor will be hitched to the fifth wheel 47 and the plant drawn to the site of operations. There the tractor is disconnected and the fifth wheel 47 elevated to the dotted line position of FIGURE 11. This exposes the receiving hopper 50 to bulk cement trucks which may back in and discharge their cement load into the hopper 50. The hopper 50 is a gasketed-tight hopper for receiving the bulk cement which is force fed through the small screw conveyer 51 into the inclined batching conveyer 55. This batching conveyer 55, while passing through the tank 45 is isolated therefrom by the tubular casing 56 so that the load delivered to this inclined conveyer 55 is compelled to travel upwardly through the tank 45 to the elevated hopper 57.

The flow of cement is actually controlled through the normal batching method or cycle by means of the tubular valve 58 which controls entrance to the weigh batcher 59.

The scale or beam box 79 is mounted at the side of the tank 45 so that the operations of this unit, like that of the aggregate unit, are controlled from ground level.

The cement is discharged from the batcher 59 through the discharge gate 60 into the surge receptacle 61 and fed into the boot 62 of the bulk cement elevator by which it is elevated and discharged through the delivery spout 65 into a truck or some suitable receptacle.

Whenever inclined screw conveyer 55 is in operation and the gate 58 is closed the continuing flow of cement to the hopper 57 is absorbed by the top tank conveyer 70 which delivers the excess cement back into the tank 45. As the conveyer 70 runs the full length of the tank 45 the cement will be delivered all the way back thus obtaining complete usage of the available capacity of the tank 45.

Whenever use is to be made of the cement thus stored in the tank the bottom conveyer 74 is put into operation by which the cement in the tank is delivered through the tube outlet 78 to the receiving hopper 50 and is thus recycled to the inclined conveyor 55.

To as great an extent as possible, cement is taken from the delivering cement trucks rather than from the reserve supply in the tanks for the batching operations, the supply in the tank only being called upon at such times as no cement delivery truck is on the job site.

The arrangement of conveyors provides for continuous supply at all times of cement to the elevated hopper 57 from which a continuous batching process is carried out with the aid of a small batcher and the surge receptacle 61 in connection with the elevator.

The aggregate elevator 29 is driven by a gear motor with chain and sprocket reduction. The belt conveyor 27 is driven by a motor with reduction unit and V-belt drive.

The elevators in both units, that is, the aggregate unit and the cement unit, are raised and lowered by a winch and cable arrangement.

Although we have disclosed herein the best form of the invention known to us at this time, we reserve the right to all such modifications and changes as may come within the scope of the following claims.

What is claimed is:

1. In a portable batching plant, a mobile aggregate unit comprising means for storing and matching materials, an elevator for receiving and elevating the batched material to truck delivery height, said elevator having a head section normally extending above the road clearance level, a boot section movably mounted to said unit for up and down movement, said head section being pivoted to the unit, cam means fixed to pivot with said head section, elevating means connected to said boot section and to said cam means for elevating said boot section when the head section is lowered and to lower the boot section when the head section is raised, said boot section serving as a counterbalance for the head section.

2. A mobile aggregate unit as claimed in claim 1 wherein the last-named means connecting the boot section to the head section are cables secured between the head and boot section and positioned to be acted upon by the cams which are fixed to pivot with the head section.

References Cited in the file of this patent

UNITED STATES PATENTS

| | | |
|---|---|---|
| 1,802,340 | Fieroh | Apr. 28, 1931 |
| 1,915,758 | Pierce | June 27, 1933 |
| 2,190,724 | McBride | Feb. 20, 1940 |
| 2,310,592 | Noble | Feb. 9, 1943 |
| 2,477,790 | Farr | Aug. 2, 1949 |
| 2,867,336 | Soldini et al. | Jan. 6, 1959 |